United States Patent [19]

Teilgård et al.

[11] Patent Number: 5,817,358
[45] Date of Patent: Oct. 6, 1998

[54] METHOD OF SALTING CHEESE

[75] Inventors: Jarl Teilgård, Skjetten, Norway; Per Busk, Silkeborg, Denmark

[73] Assignee: APV Pasilac A/S, Aarhus C, Denmark

[21] Appl. No.: 737,358

[22] PCT Filed: May 10, 1995

[86] PCT No.: PCT/DK95/00186

§ 371 Date: Nov. 8, 1996

§ 102(e) Date: Nov. 8, 1996

[87] PCT Pub. No.: WO95/30335

PCT Pub. Date: Nov. 16, 1995

[30] Foreign Application Priority Data

May 10, 1994 [DK] Denmark ................................. 0538/94
Dec. 23, 1994 [DK] Denmark ................................. 1479/94

[51] Int. Cl.⁶ ..................................................... A23C 19/16
[52] U.S. Cl. .............................. 426/394; 426/89; 426/90; 426/130; 426/127; 426/289; 426/302; 426/582; 426/650; 426/410

[58] Field of Search ................................ 426/89, 90, 130, 426/289, 302, 582, 650, 394, 410, 127, 310

[56] References Cited

U.S. PATENT DOCUMENTS

| | | | |
|---|---|---|---|
| 3,798,340 | 3/1974 | Reinbold et al. | 426/361 |
| 4,300,446 | 11/1981 | Hazen | 99/461 |
| 4,448,116 | 5/1984 | Muzzarelli | 99/460 |
| 4,815,368 | 3/1989 | Nelles | 99/452 |

*Primary Examiner*—Milton Cano
*Attorney, Agent, or Firm*—McDermott, Will & Emery

[57] ABSTRACT

A method of salting a cheese in a water-impermeable packing, where the desired amount of salt is applied on one or more of the outer surfaces of the cheese and/or in the used packing material, whereafter a water-impermeable packing is provided by means of said packing material, said packing surround the cheese and the salt. The method renders it possible to avoid the complicated and cost-intensive brining in brine and to control the content of salt to an optimal degree.

29 Claims, No Drawings

METHOD OF SALTING CHEESE

TECHNICAL FIELD

The present invention relates to a method of salting cheese.

TECHNICAL BACKGROUND

The manufacture of cheese products usually employs milk or a milk product in a non-concentrated or a concentrated state as starting material. The most essential feature of the manufacture of cheese is an acidifying and/or renneting process whereby the pH-value of the cheese mass is lowered to a value usually below 5.3 to 5.4 by means of either acid generating starter microorganisms or another acidifying starter agent in combination with a simultaneous use of rennet. As a result, the enzymic effect of the rennet ensures the desired formation of cheese by a coagulation of the casein of the milk product.

The ready-made cheese must usually contain salt out of consideration for taste, texture, and shelf life. The microorganisms used by the manufacture of cheese usually necessitate an addition of salt after the finished acidifying process because high concentrations of salt may impede such microorganisms and result in a deteriorated cheese quality. The cheese is usually of a semi-solid or solid texture due to the shaping thereof for instance in a cheese press, and accordingly the succeeding addition of salt can be both difficult and time-consuming.

By the conventional salting of cheese the cheese is usually placed in a brine after a suitable cooling period of typically 12 hours. The brine is often a saturated brine containing approximately 25% by weight of salt (mainly sodium chloride). In order to ensure that the desired salt content, usually 1 to 1.5% by weight of salt, is absorbed in the cheese, said cheese must stay in the brine for approximately 24 hours.

Salting in brine (brining) is a very space-requiring process due to the necessary stay period. To this must be added the costs involved in the equipment and the handling. In order to illustrate the complex structure of a brining plant, reference is made to the cheese brining system described in U.S. Pat. No. 4,815,368 (Nelles). Such a system is quite expensive and room-requiring per se. In addition, a major drawback is found in the brining process developing a strong salt fog which is unpleasant to work in and which has a highly corrosive effect on the equipment. The brine causes bacteriological problems, the reason why the entire brining plant must be subjected to a cleaning and the brine must be pasteurized or microfiltered at regular intervals.

Attempts have been made at performing the cheese salting by way of injection through needle-shaped pipes inserted in the cheese mass. This method turned out, however, to be unsuited because the structure of the cheese is destroyed by the insertion.

Another attempt at avoiding the complicated brining has been described in U.S. Pat. No. 3,798,340 (Reinbold et al.). According to this publication, porous absorbing materials, such as cellulose sponges, are applied to at least two of the sides of a cheese block inside a closed container, a salt solution being provided in said cellulose sponges. In the closed container, the salt from the sponge can diffuse into the cheese so as to salt said cheese. The method suggested by Reinbold is, however, encumbered with the major drawback that the introduction of a porous sponge requires taking of extensive precautionary measures in order to avoid a deterioration or destroying of the cheese due to microbiological pollution. In addition, the used porous sponge presents a foreign body which must be removed and disposed of upon use, preferably in an environmentally acceptable manner.

It is a well-known fact that when a highly concentrated salt-containing material is applied to the surface of cheese, said cheese is softened by way of osmosis in the area immediately surrounding the salt applied with the result that the structure and texture of the ready-made cheese product is deteriorated or destroyed.

The latter knowledge is confirmed by the disclosure of the above U.S. Pat. No. 3,798,340 (Reinbold et al.), because the solution suggested by Reinbold implies that some impeding effect is obtained by placing the osmotically active salt-containing material in a sponge in such a manner that the strong osmotic effect is delayed or hampered. The same teaching forms apparently the basis of an embodiment according to said US publication, whereby the salt is used in form of solid salt. By this embodiment, the salt is applied to the side of the sponge facing away from the cheese in such a manner that the sponge provides a delayed migration of the salt into the cheese with the result that the difference in osmotic pressure is reduced across the surface of the cheese. In column 7, line 13–15, Reinbold indicates that it is important to keep the salt in dry form away from a direct contact with the outer surface of the cheese.

Despite the desire of avoiding the complicated brining, none of the above attempts have been successful in convincing persons skilled in the art about the fact that brining can be avoided when it is desired to obtain a cheese of a quality acceptable to the customers with respect to both taste and texture, said attempts probably being unsuccessful due to the above draw-backs.

BRIEF DESCRIPTION OF THE INVENTION

It turned out surprisingly that a cheese can be salted by placing the salt in direct contact with the cheese without using any osmotically impeding or diffusing-delaying material at all in a water-impermeable packing and without destroying the organoleptic properties of the cheese. Thus the present invention relates to a method of salting cheese in a water-impermeable packing by means of a packing material, whereby the desired amount of salt is added in form of a salt-containing solution or dispersion or in form of solid salt directly on one or more of the outer surfaces of the cheese and/or in the packing material, whereafter a water-impermeable packing surrounding the cheese and the salt is provided by means of said packing material.

This method renders it possible to salt a cheese after the shaping thereof without necessitating a performing of the difficult and cost-intensive brining. The following procedure is followed: Initially, the cheese is packed together with the calculated amount of salt which is kept in direct contact with the outer surface of the cheese. Subsequently, the cheese is allowed to stay in the packing until the desired equilibration for the salt concentration is obtained in the water phase of the cheese at the same time as an equilibrium is obtained in the distribution of the water phase in the cheese mass. As a result, the essential advantage is obtained that it is possible to control the salt content in each cheese within narrow tolerances about the optimal value.

By placing the calculated amount of salt directly on one or more of the sides of the cheese in accordance with the invention, such as on the top side and the bottom side, and by packing the cheese with salt applied thereon in a water-impermeable packing, it is possible to obtain a satisfying cheese with the desired texture and with the salt uniformly distributed throughout the entire cheese mass. Such a uniform distribution can be obtained because in practise the aqueous phase of the cheese is a continuous phase with the effect that the salt is uniformly distributed in the cheese within a relatively short period of time in accordance with known chemical and physical principles.

The packing of the cheese in a water-impermeable sheet can in practise be performed by applying the salt according to a predetermined pattern, such as in form of stripes of a salt solution, salt dispersion or dry salt, such as salt particles, onto the sheet before the cheese is placed thereon. Then the cheese is placed on top of the sheet with stripes of salt, and additional stripes of salt are applied to the upper outer surface of the cheese. When the cheese is then immediately wrapped in the water-impermeable sheet, it turned out that said sheet provides a reliable support sufficient for retaining the cheese in the initial softening phase which is developed as a consequence of the contact with the concentrated salt. Once the salt has been uniformly distributed throughout the entire cheese mass, the cheese re-establishes the desired structure also in the portions adjacent the outer surface.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

DETAILED DESCRIPTION OF THE INVENTION

The method according to the invention allows applying of for instance salt in dry form, such as salt particles flat salt-containing sheets, plates, tablets, or flat salt blocks, onto one or more of the outer surfaces of the ready-made cheese, whereafter both the cheese and the salt is wrapped in a water-impermeable packing. In practise it turned out, however, often to be advantageous to apply the salt in form of a salt suspension or salt dispersion typically containing 40 to 60% by weight, for instance approximately 50% by weight of salt and 50% by weight of water. Such a dispersion has a mushy consistency and a sufficiently homogeneous composition so as to allow the salt dispersion to the sprayed in the desired amount in form of stripes.

In a further embodiment the salt dispersion can advantageously be a viscous, paste-like salt dispersion typically containing 50 to 80% by weight, such as 60 to 75% by weight of salt. To achieve such a viscous salt dispersion it is usually necessary to add a stabilizer as adjuvant for stabilizing the water phase. Such a stabilizer must, of course, be acceptable for use in articles of food. Particularly advantageous stabilizers are natural ingredients of milk, such as sodium caseinate or whey protein.

Firstly, such viscous, paste-like salt dispersions present an advantageously high content of salt. In addition, they ensure considerable advantages by being easy to handle and accordingly suited for an accurate and uniform distribution on the outer surface of the cheese. Thus, a paste-like salt dispersion may for instance be applied as stripes of strings which do not flow out, but remain on the outer surface of the cheese both before and during the packing procedure.

When the cheese is sufficiently solid, it is also possible to use a salting material containing a relatively low salt concentration, such as in form of an ordinary brine, i.e. a saturated salt solution.

A dosing unit suitable for the above measured spraying of a fluid salt-containing preparation in form of a salt solution or salt dispersion is the dosing unit type NDU, which is sold by APV Pasilac A/S, DK-8600 Silkeborg, Denmark. This dosing unit has already proved suited for dosing salt dispersion in connection with salting of butter.

Any packing material can be used as packing material by the method according to the invention, provided it is acceptable for use in contact with articles of food and provided it is sufficiently water-impermeable. In some cases, the packing material used should be water-impermeable as well gas-permeable when it is to be used for some types of cheese generating much gas, such as emmentaler. Other types of cheese, such as Danbo cheese, generate only insignificant gas, and for such types of cheeses it is possible to use both water-impermeable and gas-impermeable packing materials.

Particularly preferred packings are such made of film or sheet capable of surrounding and fixing the cheese after the packing. Examples of suited packing films are various laminates comprising a layer of polyethylene on the side facing the cheese, and which can be provided with or be without a gas-barrier layer as required. Examples of suitable laminates are for instance the following laminates all sold by Raackmanns Fabriker A/S, Hattingvej 10, DK-8700 Horsens, Denmark:

PA/PVdC/PE, comprising the following layers seen from the outside and inwards towards the cheese: polyamide/polyvinylidene chloride/polyethylene.

PA/PE-E-PE, comprising in the same sequence: polyamide/poly ethylene/ethylene vinylalcohol/polyethylene.

PE-E-PE/PA/PE, comprising in the same sequence: polyethylene/ethylene vinylalcohol/polyethylene/polyamide/polyethylene.

PE/PVdC/PA/PE, comprising in said sequence: polyethylene/polyvinylidene-chloride/polyamide/polyethylene.

PE/PVdC/PA/PVdC/PE comprising in said sequence: polyethylene/polyvinylidene chloride/polyamide/polyvinylidene chloride/polyethylene.

The cheese salted by the method according to the invention is usually present in form of a cheese block resulting from acidification and/or rennet processing of the cheese by way of pressing in a cheese press, where whey is liberated while a pressed cheese block of a suitable solidity is obtained.

The pressed cheese block is typically a block of for instance 10 kg available as a cheese block which can be handled, i.e. moved. The cheese block cannot, however, stand a too violent handling as the surface structure may thereby be damaged.

In many cases the structure of the outer surface of the cheese is so soft that it is important that the feeding of salt, such as in form of dry salt or in form of a salt dispersion, is performed in a careful and lenient manner. Thus, it is not advisable in this case to carry out an actual rubbing of the salt into the outer surface of the cheese.

After the pressing, the cheese block is usually of a temperature of 25°–37° C. Some types of cheese may, however, be of a substantially higher temperature, such as perhaps up to 60° or 70° C. Conventional salting in brine can involve either a cooling down of the cheese block to a temperature of approximately 10° C. usually during approximately 12 hours before the cheese block is transferred to the brine, or a transferring of said cheese block directly into the brine.

Also by the method according to the invention, the salting can be performed after a cooling down of the cheese block to 10° C. It turned out, however, that the feeding of salt and the packing can advantageously be performed immediately upon the pressing of the cheese block, i.e. when the cheese is a few minutes old and still of a temperature of approximately 20°–70° C., typically approximately 25°–37° C.

In addition to saving the costs involved in cooling down to 10° C., it turned out that in this manner a cheese of an improved quality is obtained. The improved quality is assumed to be due to the outer surface not being subjected to a chock-cooling, which can cause a vigorous post-acidification in the outer surface.

When the salt is applied to the outer surface of the cheese, said salt is distributed in the cheese through the water phase. The temperature of the cheese at the salting is here decisive for the speed at which the salt is absorbed. A higher temperature causes a faster absorption of salt. Tests have shown that cheese blocks, treated by the method according to the invention and not cooled prior to the salting and packing, absorbed the salt very quickly. In addition, the surface was dry and fine unlike corresponding cheeses, which had been subjected to a cooling prior to the salting, where the surface was moist. The texture of the cheeses not having been cooled prior to the salting was very satisfactory.

Conventional brining implies that the cheese usually liberates some fluid to the brine. By the method according to the invention this fluid is retained in the packing and reabsorbed in the cheese before the packing is opened. The manufacture of a cheese with a desired dry matter content must, of course, consider the above in such a manner that a pressed cheese block manufactured as starting material is to contain slightly more dry matter than the cheese block to be salted in brine. Such an adjustment of the dry matter content is a routine procedure also being continuously performed today in connection with conventional manufacture of cheese involving brining.

The salting by the method according to the invention has been terminated when the salt has been absorbed in the water phase of the cheese and when the fluid exuded on the outer surface of the cheese has been reabsorbed in the cheese mass. Such a cycle is usually completed in approximately 48 hours, while the packed, salted cheese block is placed in a store room at 10°–12° C. After the salting, the packing can be ripped open and the cheese be ripened in a conventional manner. It is, however, also possible to leave the cheese block in the packing during the entire subsequent ripening period or during the first part thereof.

By the manufacture of conventional rind cheese it is thus possible to keep the wrapped cheese in the packing for approximately 2 weeks at 10°–12° C., whereafter the packing is unwrapped and the ripening is continued in a usual manner at approximately 20° C. while the rind is formed with or without a conventional smearing, i.e. application of a bacteria-containing layer.

For the manufacture of rindless cheese, said cheese is advantageously left in the packing during the entire ripening period. In this case, the ripping open of the packing can be postponed until immediately before the cheese is cut up and packed in the retail packing. The storing of the salted cheese in the impermeable packing during the entire ripening period makes it extremely easy to handle the cheese during the ripening period. As the cutting up and packing in retail packings are often carried out another place than the place of the manufacture and the ripening of the cheese, particular advantages are provided in connection with the delivery as the cheese is already placed in a protecting packing after the salting step.

As mentioned, the ripening is usually carried out in cheese blocks of for instance 10 kg. It is, however, also possible to ripen the cheese in form of small blocks. In this case it is possible to salt and wrap the pressed and optionally cut out small cheese blocks and to use the packing as the ready retail packing.

It turned out surprisingly that the structure of the cheese is not destroyed by the salting method according to the invention. The latter feature can be attributed to the fact that the packing supports the cheese throughout a critical phase where the cheese presents a very soft outer surface. In practise, the method has been tested in connection with packing in a plastic film, but it is expected that it can also be performed in connection with another type of packing, such as for instance a close-fitting cylindrical container. The latter container is preferably made of a material which is easy to clean, such as metal, plastics or glass.

In addition, it is found to be important that the packing is so close-fitting that the fluid being liberated from the outer surface of the cheese during the salting is always kept in close contact with said outer surface.

EXAMPLE 1

The following tests were performed in order to substantiate the carrying out of the method according to the invention and in order to confirm the result expected.

Two cheesings were performed in 150 l cheese vats with cheese of the type Havarti, whereby 6 pieces of cheese of 4 kg/piece were produced.

The six cheeses were subsequently pressed by a pressure of 3 bar (300 kPa) for 90 minutes, whereafter they were removed from the moulds.

The ready-pressed cheeses were placed in a water bath of corporation water for approximately 12 hours so as to be cooled down and achieve a form stability and a completed acidification.

One cheese from each of the two cheesings was halved into approximately 2 kg/pieces and sprayed with natamycine to inhibit mould growth.

All four cheeses of 2 kg/piece were weighed and placed in their respective weldable, water-impermeable bag together with 2% by weight of dry salt. Each bag was turned upside down and around manually until the salt had been distributed on all surfaces of the cheese and the bag. Then the bags were vacuum-sealed. The cheeses packed in bags were stored at 14° C. for 4 weeks with a turning upside down twice a week.

The remaining 4 cheeses were conventionally brined and ripened under the same conditions as the cheeses wrapped in bags.

After ripening for 4 weeks, the cheeses wrapped in bags and the conventionally brined cheeses were analysed and evaluated:

|  | Salting in bag | | Brining |
|---|---|---|---|
| Analysis | Cheese vat 1 | Cheese vat 2 | Cheese vat 1 |
| Dry matter % by weight | 53.90 | 52.62 | 53.25 |
| pH | 5.37 | 5.46 | 5.26 |
| Salt % by weight | 2.06 | 1.96 | 2.26 |
| Fat % by weight | 25.04 | 25.03 | 25.23 |
| Fat in dry matter % by weight | 46.5 | 47.6 | 47.4 |
| Water in fat-free cheese % by weight | 61.5 | 63.2 | 62.5 |

Organoleptic evaluation

A panel of 3 experienced persons participated.

A comparison was made between the conventionally brined cheeses and the bag-salted cheeses. Compared vat by vat, no difference was observed between the various cheeses with respect to odour, taste, and texture.

The conclusion of the tests performed is that the method according to the invention is viable on an industrial scale.

EXAMPLE 2

The present Example describes the manufacture of a viscous salt dispersion by means of whey protein concentrate as stabilizer.

A 75% by weight of paste-like salt dispersion was prepared in the following manner:

3 g of powdered whey protein concentrate (LACPRODAN 80, delivered by Danmark Protein, Nørre Vium, Videbæk, Denmark) are added to 17 g water. Then the water phase is stabilized by way of heating until the phase has become sufficiently viscous, usually at 80° C., whereafter a cooling is immediately carried out to 10°–20° C. Then 60 g of salt are admixed under stirring, said salt being of a particle size where 94% are in the range 125–600 μm. In this manner a very viscous highly concentrated paste-like salt dispersion is obtained. This salt dispersion is of such a texture that it can be pressed out, such as through a nozzle, and directly onto the outer surface of the cheese in form of stripes or in another pattern, such as for instance small tops. After the packing of a cheese salted with this whey protein-containing salt dispersion, the whey protein is absorbed and homogeneously distributed in the cheese in the same manner as the salt.

In the same manner a less viscous, but still suitable salt dispersion containing 60% by weight of salt is prepared from 6 g LACPRODAN 80, 36 g water and 60 g salt.

EXAMPLE 3

The present Example uses sodium caseinate (MIPRODAN, delivered by MD Foods, Viby, Denmark) as stabilizer. A viscous salt dispersion of the same type as described in Example 2 is prepared by means of a sodium caseinate-stabilized water phase containing 10% by weight of sodium caseinate. The water phase is stabilized by way of heating and a subsequent cooling as described in Example 2, whereafter it is mixed with salt in a weight ratio of 40:60 and 25:75. Also the sodium caseinate is absorbed and homogeneously distributed in the cheese during the salting.

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

We claim:

1. A method for salting cheese in a water-impermeable packing comprising the steps of:
   providing a flow of salt from a source directly to an outer surface of a quantity of cheese; and
   packaging the cheese in said packing to permit salt to be adsorbed by a water phase of the cheese and to permit fluid exudate from said cheese to be readsorbed, wherein said flow is free of contact with a porous substrate.

2. The method of claim 1, further comprising the step of distributing the salt on the outer surface of the cheese.

3. The method of claim 1, further comprising the step of permitting the cheese to ripen.

4. The method of claim 1, wherein the cheese is in the form of a block.

5. The method of claim 1, wherein the salt is in an aqueous solution.

6. The method of claim 5, wherein the aqueous solution is saturated.

7. The method of claim 6, wherein the aqueous solution is brine.

8. The method of claim 5, wherein the solution contains 20% to 60% by weight of salt.

9. The method of claim 5, wherein the solution is a dispersion.

10. The method of claim 9, wherein dispersion contains 50% by weight salt.

11. The method of claim 9, wherein the dispersion contains 40% to 60% by weight salt.

12. The method of claim 11, wherein the dispersion is viscous.

13. The method of claim 9, wherein the dispersion further comprises an adjuvant for stabilizing a water-phase and wherein said adjuvant containing dispersion contains 50% to 80% by weight salt.

14. The method of claim 13, wherein the adjuvant is edible.

15. The method of claim 14, wherein the adjuvant is a natural ingredient of milk.

16. The method of claim 15, wherein the adjuvant is selected from the group consisting of sodium caseinate and whey protein.

17. The method of claim 1, wherein the salt is in the form of solid salt.

18. The method of claim 17, wherein the solid salt is in particulate solid form.

19. The method of claim 1, wherein the water-impermeable packing is acceptable for use with articles of food.

20. The method of claim 1, wherein the water-impermeable packing is gas-permeable.

21. The method of claim 1, wherein the water-impermeable packing is gas-impermeable.

22. The method of claim 1, wherein the water-impermeable packing is a laminate.

23. The method of claim 22, wherein the laminate is selected from the group consisting of PA/PVdC/PE, PA/PE-E-PE, PE-E-PE/PA/PE, PE/PVdC/PA/PE, and PE/PVdC/PA/PVdC/PE.

24. The method of claim 1, wherein the water-impermeable packing in is pre-coated with the salt before packaging.

25. The method of claim 1, wherein one or more surfaces of the cheese are contacted with the salt.

26. The method of claim 25, wherein the one or more surface of the cheese comprise the top and bottom surfaces.

27. The method of claim 1, wherein the process is performed at a temperature of 25° to 70° C.

28. The method of claim 1, wherein the salt is in a form selected from the group consisting of flat salt-containing sheets, plates, blocks and tablets.

29. The method of claim 28, wherein the forms further comprise an edible adjuvant.

* * * * *